May 2, 1933.   R. A. ROTT   1,907,217
REFRIGERATED TRUCK BODY
Filed July 30, 1932   3 Sheets-Sheet 1
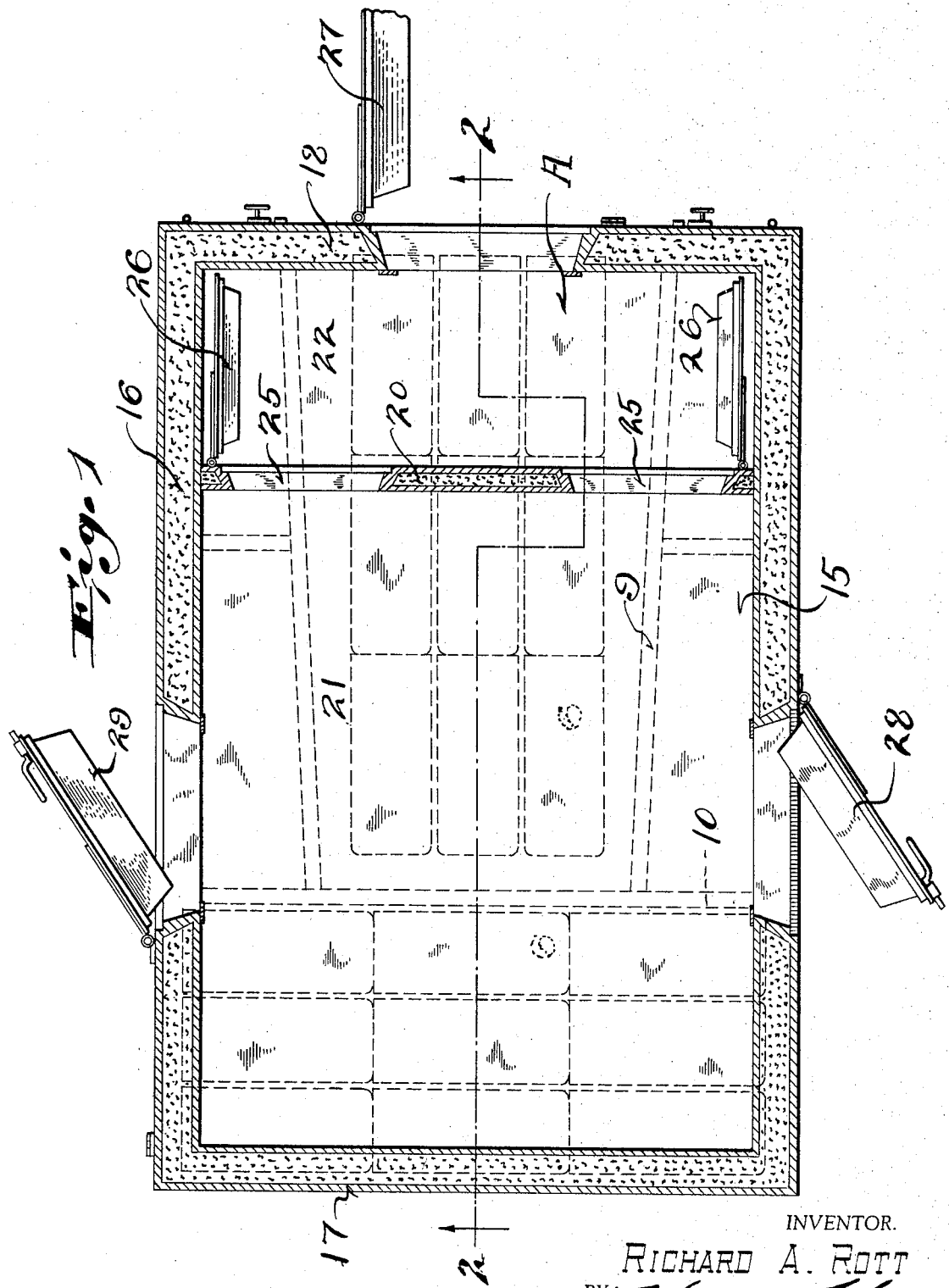
INVENTOR.
RICHARD A. ROTT
BY
ATTORNEY.

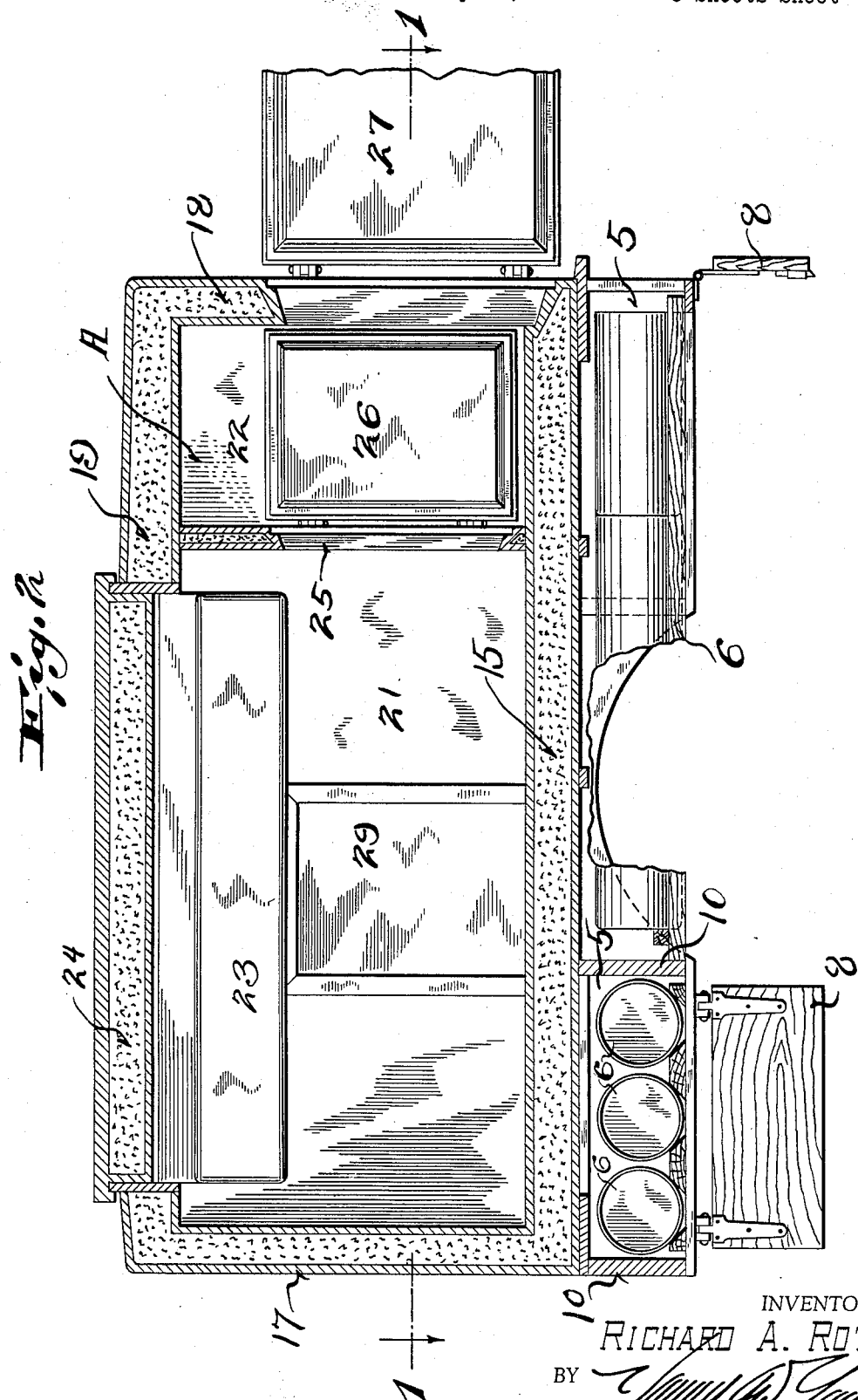

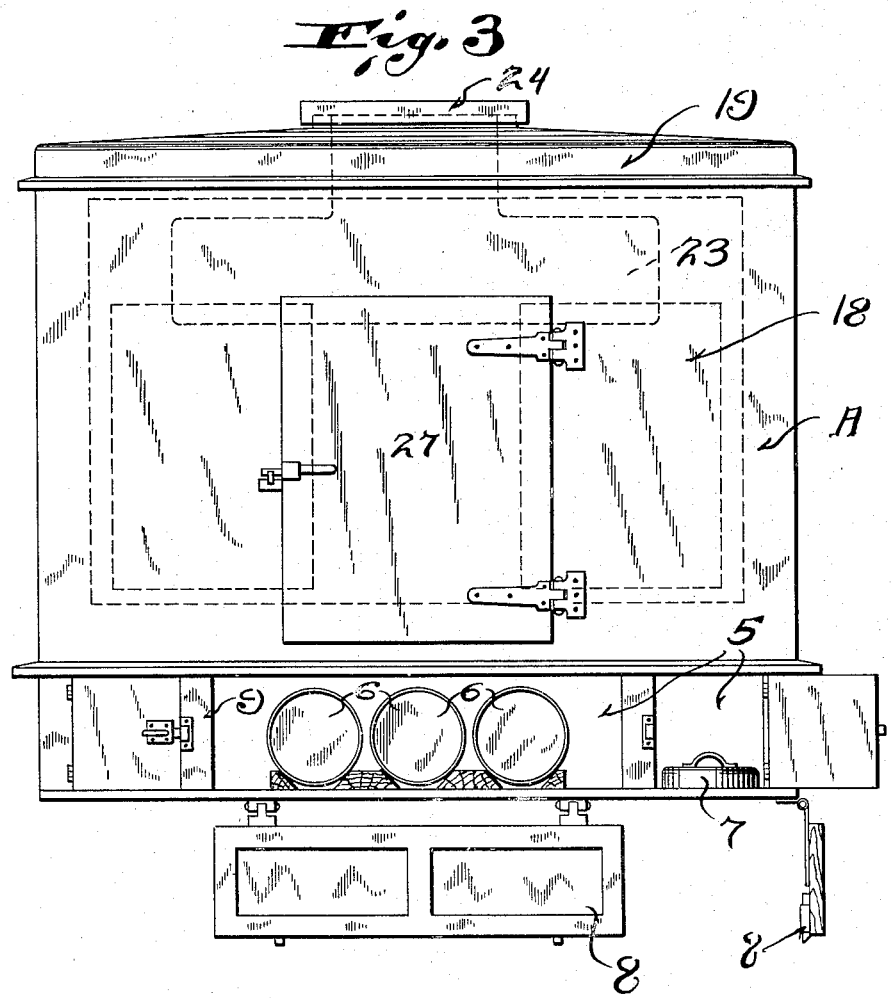

Patented May 2, 1933

1,907,217

UNITED STATES PATENT OFFICE

RICHARD A. ROTT, OF MADISON, WISCONSIN

REFRIGERATED TRUCK BODY

Application filed July 30, 1932. Serial No. 627,474.

This invention appertains to trucks, and more particularly to refrigerating trucks of the type employed for delivering ice cream to retail stores.

In trucks of this character, the handling of the empty ice cream cans presents quite a problem, in that continual opening and closing of the doors of the body for the empty cans tends to admit warm air into the refrigerating compartment, and the empty cans themselves are often in a warm condition, which tends to raise the temperature of the compartment. Further, the placing of the empty cans in the ice cream compartment prevents the expeditious handling of the filled cans and the empty cans occupy valuable space, which prevents the full capacity of the truck to be utilized for full ice cream cans.

It is, therefore, one of the primary objects of my invention to provide a novel refrigerated truck body, in which the entire floor space can be utilized for handling full cans of ice cream, and in which means is provided for receiving the first empty cans exteriorly of the truck body, allowing the free removal of full cans from the body until such a time that adequate space will be provided in the truck body for receiving additional empty cans.

Another prime object of my invention is the provision of a refrigerated truck for delivering ice cream to the retail trade, in which means is provided below the truck body for receiving empty ice cream cans, the space below the truck body being normally occupied by supporting stringers for the body, the division walls forming the compartments for receiving the empty cans, acting as supports for the truck body in lieu of certain stringers, bolsters and the like.

A further salient object of my invention is the provision of a refrigerated truck body divided by a partition into a main ice cream receiving compartment and a supplemental ice cream receiving compartment, the main compartment being provided with the refrigerating medium and the transverse partition having doors therein, for permitting the circulation of cool air from the main compartment into the supplemental compartment, the supplemental compartment being unloaded in advance of the main compartment, whereby upon the emptying of the supplemental compartment, the doors between the compartments can be closed so that the supplemental compartment can be used thereafter for the reception of empty cans, without raising the temperature of the main compartment.

A still further object of my invention is the provision of a refrigerated delivery truck for ice cream, so constructed that the empty and full cans can be conveniently and expeditiously handled without materially effecting the interior temperature of the truck body.

A still further object of my invention is to provide a refrigerated ice cream delivery truck of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, in which:

Figure 1 is a horizontal section through the body of my improved refrigerated truck, taken substantially on the line 1—1 of Figure 2, looking in the direction of the arrows;

Figure 2 is a longitudinal section through the truck body taken on the line 2—2 of Figure 1, looking in the direction of the arrows;

Figure 3 is a rear end elevation of the truck body illustrating the compartments below the body for receiving the empty cans and covers.

Referring to the drawings in detail, wherein similar reference characters designate corresponding parts throughout the several views, the letter A generally indicates my improved refrigerated truck body.

In delivery trucks of this character, the bodies are generally mounted on the chassis by the use of supporting stringers, bolsters and the like. This provides a waste space between the chassis and the body, which is not utilized for any purpose.

In accordance with my invention, I so arrange these stringers and bolsters to provide a plurality of small compartments 5 for the reception of empty ice cream cans 6, and can covers 7. It is to be understood that the larger compartments are utilized for receiving the can bodies, while the smaller compartments are utilized for receiving the can covers. These compartments 5 can open outward of the sides and rear end of the body and can be closed by doors 8, which can be of an ornamental character, if so desired, so as to add to the appearance of the truck. By referring to Figure 1 of the drawings, it can be seen that the stringers and bolsters forming the compartments 5 are indicated respectively by the numerals 9 and 10.

By this novel arrangement, space is provided for receiving the empty cans from the stores at the start of the delivery trip, which will provide means for permitting the emptying of a certain part of the truck body of the full cans without the necessity of placing any of the empty cans within the body. Not only does this allow the easy unloading of the truck body, but also dispenses with the necessity of continually opening the doors of the truck body for receiving the empty cans, and, consequently, the entrance of warm air into the truck body is reduced to a minimum. In connection with the means for receiving the empty cans, I also provide a novel form of truck body and, as shown, in accordance with my invention, the truck body includes an insulated bottom wall 15, insulated side walls 16, insulated front and rear end walls 17 and 18, and a top insulated wall 19. This provides a completely closed heat insulated body which may be considered as of the ordinary type.

However, in accordance with my invention, I arrange a transverse partition 20 in the truck body in such a manner as to form a relatively large front compartment 21, and a relatively small rear compartment 22. As shown, the size of the rear compartment 22 is a little less than one-third of the capacity of the truck.

The main compartment 21 receives any preferred type of refrigerating medium and the same may be in the nature of bunkers 23 for the reception of ice and salt, carbon dioxide, an electrical refrigerating unit, or the like. The top wall 19 can be provided with removable entrance doors 24 so that the desired attention to the refrigerating unit can be given.

In order that the small compartment 22 can be cooled from the main compartment 21, openings 25 are provided in the partition 20 and this allows the circulation of air between the compartments. These openings 25 can be closed by the use of suitable doors 26, which permits the smaller compartment 22 to be entirely cut off from the larger compartment 21 when so desired.

The rear wall 18 carries an outwardly opening door 27 which permits free entrance to be had to the small compartment 22 from the exterior of the truck.

In order to permit convenient access into the main compartment 21, the opposite side walls 16 can be provided with entrance doors 28 and 29.

By this arrangement of parts, when the small compartment 22 has been unloaded, the doors 26 can be closed, so as to completely shut off the smaller compartment 22 from the main or large compartment 21, and the small compartment 22 can then be utilized for the reception of empty cans.

The advantages of a refrigerated truck constructed in accordance with my invention, are many, and it is obvious that the entire floor space of the truck can be utilized for the full cans of the ice cream, increasing the capacity of the truck approximately 30%. The arrangement eliminates the use of the main compartment for empty cans until about 60% to 70% of the ice cream has been delivered, or unloaded.

This arrangement is of special importance, for the reason that when solid carbon dioxide is used as a refrigerant, the cost is much higher than that of ice and salt. While the capacity of the truck is materially increased, there is no increase in the weight thereof. In this manner, a one and one-half ton truck will suffice, where a two ton truck was required formerly. The flexibility of this truck body is such that at the beginning of the season of the ice cream trade, 50% of the full capacity of the truck may be economically carried. As the season advances, by filling up the main compartment 21 and opening the doors 26 between the compartments 21 and 22, the smaller compartment can be used for the accommodation of the pay-load, and the smaller compartments below the body can be used for receiving the first empty cans.

Changes in details may be made without departing from the spirit or the scope of this invention, but what I claim as new is:

1. In a refrigerated delivery truck, an insulated truck body, a transverse partition arranged in said truck body defining a main insulated compartment and an auxiliary insulated compartment, independent entrance doors for said compartments arranged within the walls of the body, a refrigerating medium in the main compartment, the transverse partition having openings therein for permitting the circulation of cool air from the main compartment into the auxiliary compartment and closure doors for said last mentioned openings.

2. A refrigerated truck comprising an insulated truck body, a plurality of supporting stringers for the body defining a plurality of compartments for the reception of empty ice cream cans, a transverse partition in the insulated truck body defining a main compartment and an auxiliary compartment, independent entrance doors for the main and auxiliary compartments, opening out through the main walls of the body, and a refrigerating medium in the main compartment, said main and auxiliary compartments being normally used for the reception of full cans of ice cream, the transverse partition having openings therein for permitting the circulation of cool air from the main compartment into the auxiliary compartment and closure doors for said last mentioned openings for closing communication between the auxiliary compartment and the main compartment, whereby the auxiliary compartment can be used for the reception of empty ice cream cans.

In testimony that I claim the foregoing I have hereunto set my hand at Madison, in the county of Dane and State of Wisconsin.

RICHARD A. ROTT.